United States Patent
Lee et al.

(10) Patent No.: US 7,682,893 B2
(45) Date of Patent: Mar. 23, 2010

(54) METHOD AND APPARATUS FOR PROVIDING AN INSTRUMENT PLAYING SERVICE

(75) Inventors: Sun-Gi Lee, Seoul (KR); Kook-Jun Kim, Suwon-si (KR); Dong-Ik Park, Suwon-si (KR); Kang-Hoon Lee, Yongin-si (KR); Cheong-Sun Lee, Suwon-si (KR); Dae-Hyun Sim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1401 days.

(21) Appl. No.: 11/091,788

(22) Filed: Mar. 22, 2005

(65) Prior Publication Data

US 2006/0084218 A1  Apr. 20, 2006

(30) Foreign Application Priority Data

Oct. 14, 2004  (KR) .................. 10-2004-0082043

(51) Int. Cl.
*H01L 21/8238* (2006.01)

(52) U.S. Cl. .................... 438/201; 84/470 R

(58) Field of Classification Search .............. 438/201; 84/470 R

See application file for complete search history.

(56) References Cited

U.S. PATENT DOCUMENTS

| 6,727,417 B2 * | 4/2004 | Oren-Chazon ............ 84/470 R |
| 2003/0167908 A1 * | 9/2003 | Nishitani et al. ............... 84/723 |
| 2003/0197687 A1 * | 10/2003 | Shetter ...................... 345/173 |
| 2004/0244570 A1 * | 12/2004 | Ando ......................... 84/744 |

FOREIGN PATENT DOCUMENTS

KR  10-2002-66875  10/2002

* cited by examiner

*Primary Examiner*—Jianchun Qin
(74) *Attorney, Agent, or Firm*—The Farrell Law Firm, LLP

(57) ABSTRACT

A method and apparatus for providing an instrument playing service in a portable terminal. In the method, an image of an instrument is projected. User finger movements on the projected instrument image are detected and sound source information corresponding to the user finger movements is read. Thereafter, an audio signal corresponding to the sound source information is output.

8 Claims, 7 Drawing Sheets

US 7,682,893 B2

METHOD AND APPARATUS FOR PROVIDING AN INSTRUMENT PLAYING SERVICE

PRIORITY

This application claims priority under 35 U.S.C. § 119 to an application entitled "Method and Apparatus for Providing Instrument Playing Service" filed in the Korean Intellectual Property Office on Oct. 14, 2004 and assigned Serial No. 2004-82043, the contents of which are incorporated herein by reference.

BACKGROUND OF THE INVENTION

1. Field of the Invention

The present invention relates generally to a portable terminal. More particularly, the present invention relates to a method and apparatus for providing an instrument playing service through a portable terminal.

2. Description of the Related Art

Recent technology developments have brought high-quality, diverse functions to portable terminals such as mobile phones and PDAs (Personal Digital Assistants). With this trend, the portable terminals are now equipped with a function of playing music, which extends from the function of editing melodies or bell sounds.

For example, Korean Patent Application No. 10-2002-66875 entitled "Portable Phone having Melody Playing Function" discloses a portable phone having a built-in melody chip that enables a user to play melodies using a keypad. The portable phone with the melody playing function includes the keypad with digit keys 0 to 9 for dialing a phone number and * and # as function keys, a controller for sensing a key pressed in the keypad and generating a melody selection control signal for identifying the key input. The melody chip generates a melody frequency corresponding to the melody selection control signal. A filtering unit converts the melody frequency to notes through filtering, and an amplifier for amplifies the melody notes to a predetermined power level and outputs the amplified melody notes through a speaker.

As described above, the portable terminal provides an instrument playing service through a keypad of a different shape from instruments. Therefore, even a user who may be good at playing a particular instrument may not be able to easily play music on the portable terminal.

Another disadvantage with the conventional instrument playing service is that the keypad has a limited number of keys, i.e., not enough to play music in a wide sound range.

Moreover, the time required to press a key is difficult to reduce, which in turn makes it difficult to play a percussion instrument such as the drum.

Therefore, a need exists for developing a technology that enables more natural music playing using a portable terminal.

SUMMARY OF THE INVENTION

The present invention has been designed to substantially solve at least the above problems and/or disadvantages and to provide at least the advantages below. Accordingly, an object of the present invention is to provide a method and apparatus for providing an instrument playing service that enables natural and comfortable playing of various instruments in a portable terminal.

Another object of the present invention is to provide a method and apparatus for providing an instrument playing service in a portable terminal, in which user finger movements on a projected image of an instrument are sensed and an audio signal is output in accordance with the user finger movements, enabling the user to play music using familiar instrument images.

The above and other objects are achieved by providing a method and apparatus for providing an instrument playing service in a portable terminal.

According to one aspect of the present invention, in a method for providing an instrument playing service in a portable terminal, an image of an instrument is projected. User finger movements on the projected instrument image are detected. Sound source information corresponding to the user finger movements is read and an audio signal corresponding to the sound source information is output.

According to another aspect of the present invention, in an apparatus for providing an instrument playing service, an instrument playing user interface projects an image of an instrument and detects user finger movements on the projected instrument image. A memory stores information about the instrument image and sound source information corresponding to the user finger movements on the instrument image. A user interface interfaces with the user. A sound source chip receives the sound source information and outputs an audio signal according to the sound source information. A speaker outputs the audio signal received from the sound source chip. A controller, upon receipt of a command of entry into an instrument playing service through the user interface, reads the instrument image information, provides the instrument image information to the instrument playing user interface, receives information about the user's finger movements from the instrument playing user interface, reads the sound source information corresponding to the user's finger movements from the memory, and provides the sound source information to the sound source chip.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Preferred embodiments of the present invention will be described in detail herein below with reference to the accompanying drawings. In the following description, well-known functions or constructions are not described in detail because they would obscure the invention in unnecessary detail.

Figure 1:
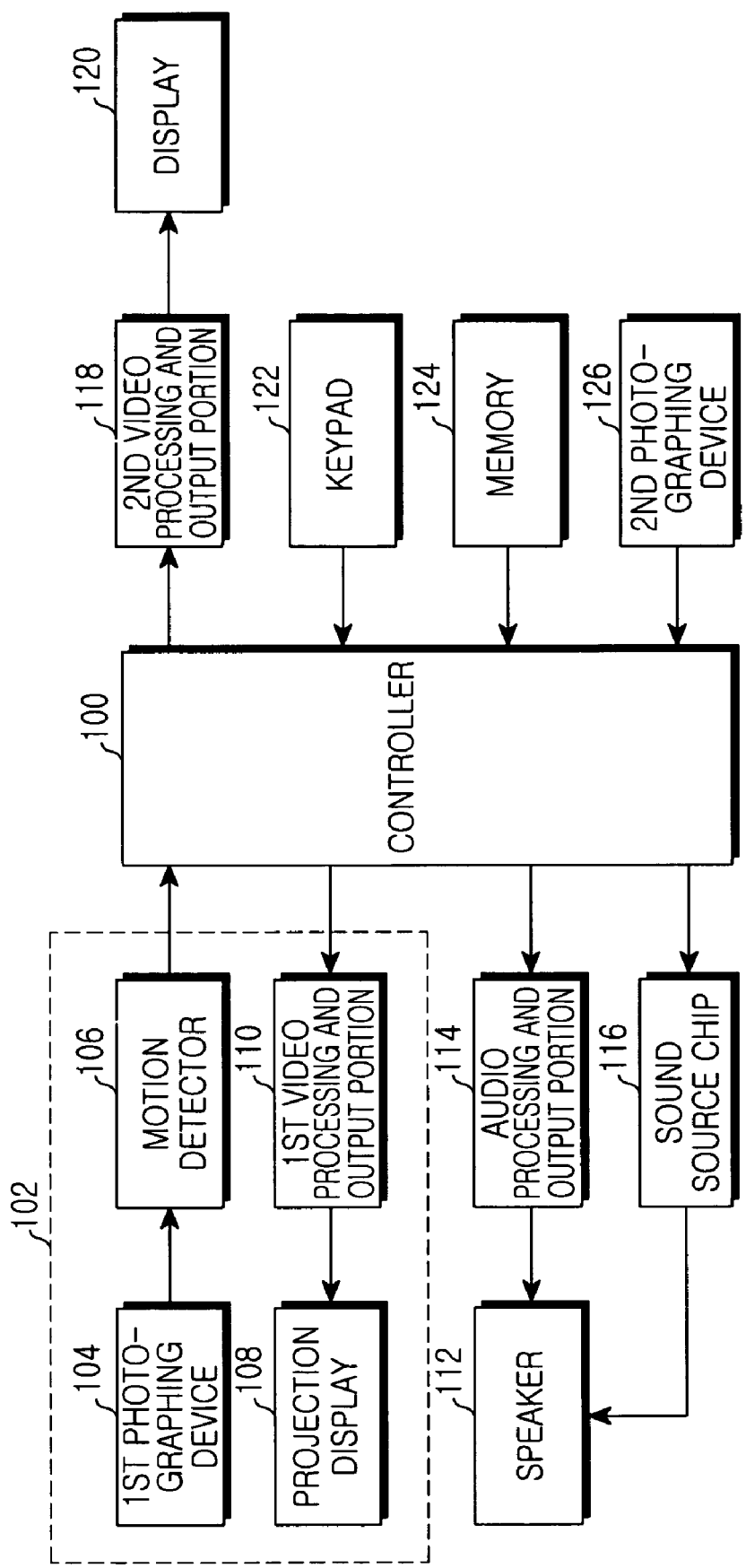
FIG. 1 is a block diagram of a portable terminal to which the present invention is applied.

FIG. 1 is a block diagram of a portable terminal according to a preferred embodiment of the present invention. Referring to FIG. 1, a controller 100 provides overall control to the portable terminal, and controls each component illustrated in FIG. 1 to provide an instrument playing service according to the preferred embodiment of the present invention.

More specifically, the controller 100 controls an instrument playing user interface 102 to provide a projected image of an instrument and to detect user finger movements on the projected instrument image. Upon receiving the sensed user finger movements from the instrument playing user interface 102, the controller 100 controls a sound source chip 116 to detect sound source information corresponding to the user finger movements and output an audio signal according to the sound source information through a speaker 112. In this manner, the instrument playing service is provided in the present invention.

Upon receiving a request for a music note from the user during the instrument playing service, the controller 100 reads the music note from a memory 124 and displays it on a display 120. The music note can be displayed in various ways. Preferably, the controller 100 displays the music in manner selected by the user.

Upon receiving a request for photographing from the user during the instrument playing service, the controller 100 captures an image of the user playing by means of a second photographing device 126 and reproduces the image on the display 120.

The memory 124 stores various pieces of information including programs executed in the controller 100. Preferably, the memory 124 stores many instrument images, sound source information corresponding to the instrument images, information about settings associated with the instruments, music notes, and captured user playing images.

Sound source information corresponding to an instrument image will be described briefly herein below, using the piano by way of example.

The instrument playing user interface 102 projects an image of piano keys and senses user finger movements on the piano keys. The instrument playing user interface 102 provides the controller 100 with information indicating the position of a key pressed by the user on the piano from the instrument playing user interface 102.

Upon receipt of the key position information, the controller 100 must acquire sound source information corresponding to the key position to control the sound source chip 116 to output an audio signal corresponding to the key position. For this purpose, the memory 124 stores a table called "sound source information for instruments", in which sound source information is mapped to each key position on the piano. Accordingly, the controller 100 acquires the sound source information corresponding to the key position and provides it to the sound source chip 116, such that the sound source chip 116 can output an audio signal to the user.

The instrument playing user interface 102 also includes a first photographing device 104, a motion detector 106, a projection display 108, and a first video processing and output portion 110. The first video processing and output portion 110 converts instrument image information received from the controller 100 to a signal by which an instrument image is projected, and provides the signal to the projection display 108. The projection display 108 projects the instrument image. The user then plays the instrument corresponding to the instrument image and the user finger motions in playing the instrument are captured in the first photographing device 104.

The motion detector 106 detects the positions of the user's fingers on the instrument from the captured image and provides the detected information to the controller 100. Thereafter, the controller 100 acquires information about the user finger movements on the projected instrument image.

The above user interfacing technology is achieved by modifying a virtual keyboard of Canesta. The Canesta Keyboard projects the image of a keyboard and identifies user finger movements on the keyboard image. The user interface of the present invention can be achieved by extending the Canesta Keyboard image to various images. Therefore, it should be appreciated that the instrument playing user interface 102 is not limited to the Canesta Keyboard because it is so configured as to project images appropriate for playing music through the portable terminal and read information along with the miniaturization of a projection display and the development of various motion perception technologies.

Figure 3A:
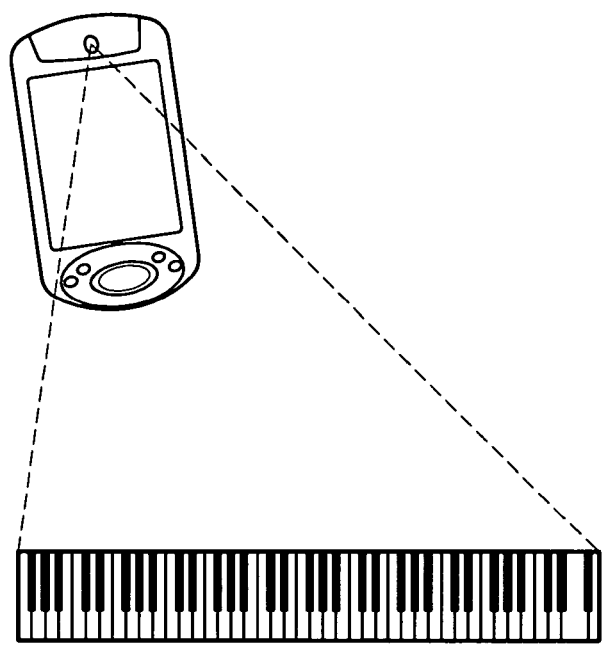
FIGS. 3A, 3B, and 3C are diagrams illustrating exemplary projected images of instruments according to a preferred embodiment of the present invention.
Figure 3B:
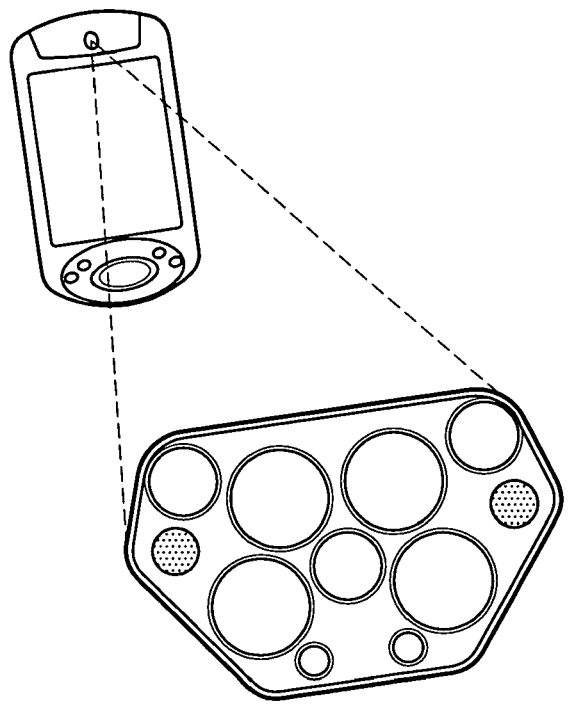
Figure 3C:
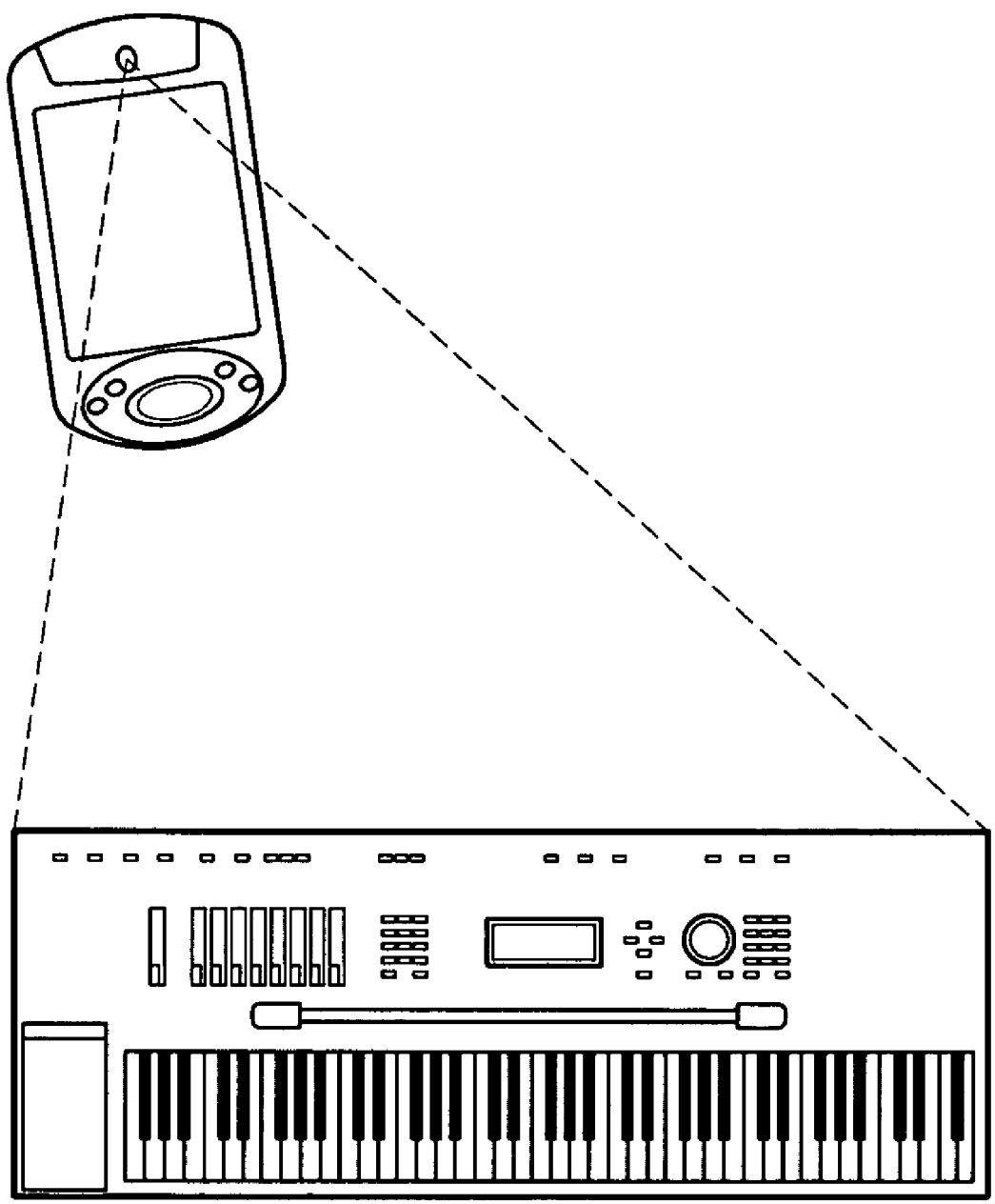

FIGS. 3A, 3B, and 3C illustrate the images of the piano, drum, and synthesizer, respectively, as projected from the portable terminal. Referring to FIGS. 3A, 3B, and 3C, the present invention projects the images of various instruments, identifies or detects the user finger movements on the images, and outputs audio signals corresponding to the user finger movements. Therefore, the user can play music through the instruments images shaped like actual instruments.

Accordingly, an audio processing and output portion 114 processes voice data for normal call operations under the control of the controller 100 and outputs the processed audio data through the speaker 112.

The sound source chip 116 generates an analog audio signal corresponding to the sound source information received from the controller 100 and outputs it through the speaker 112. The sound source chip 116 reproduces the original sounds from the piano, guitar, drum, etc., thereby enabling the user to play various instruments according to the present invention.

Preferably, a high-quality sound source chip can be used as the sound source chip 116 to modulate sounds from the instruments.

The speaker 112 outputs audio signals received from the audio processing and output portion 114 and the sound source chip 116.

A second video processing and output portion 118 processes video information or graphic information received from the controller 100 and displays the processed information on the display 120. The video information includes the images of the user playing that is captured by the second photographing device 126 and the graphic information includes music notes and other menus, as the user may request.

The display 120 outputs images or graphics received from the second video processing and output portion 118. A keypad 122 includes a plurality of keys and interfaces between the user and the controller 100 by providing key input signals from the user to the controller 100.

The second photographing device 126 is a general photographing device provided to the portable terminal. It captures images under the control of the controller 100.

The portable terminal of the present invention can have a plurality of menus. According to the embodiment of the present invention, a main menu includes a plurality of menu items implemented as graphic icons. Among the menu items, there exists a menu item for commanding entry into an instrument playing service.

Figure 4:
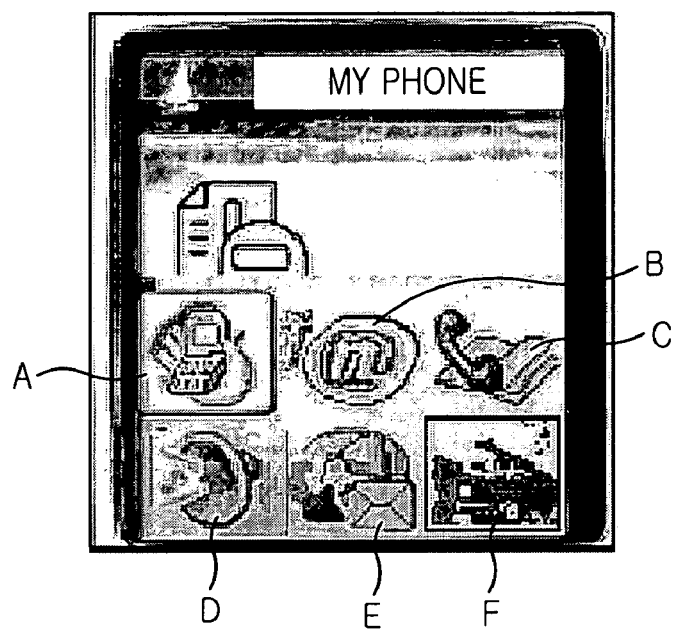
FIGS. 4 to 7 are diagrams illustrating exemplary menus according to the preferred embodiment of the present invention.

Referring to FIG. 4, there are a phone management menu item A, a wireless Internet menu item B, a phone book menu item C, an instrument playing service menu item D, a message management menu item E, and any other menu item F under the main menu on the display 120.

Figure 2A:
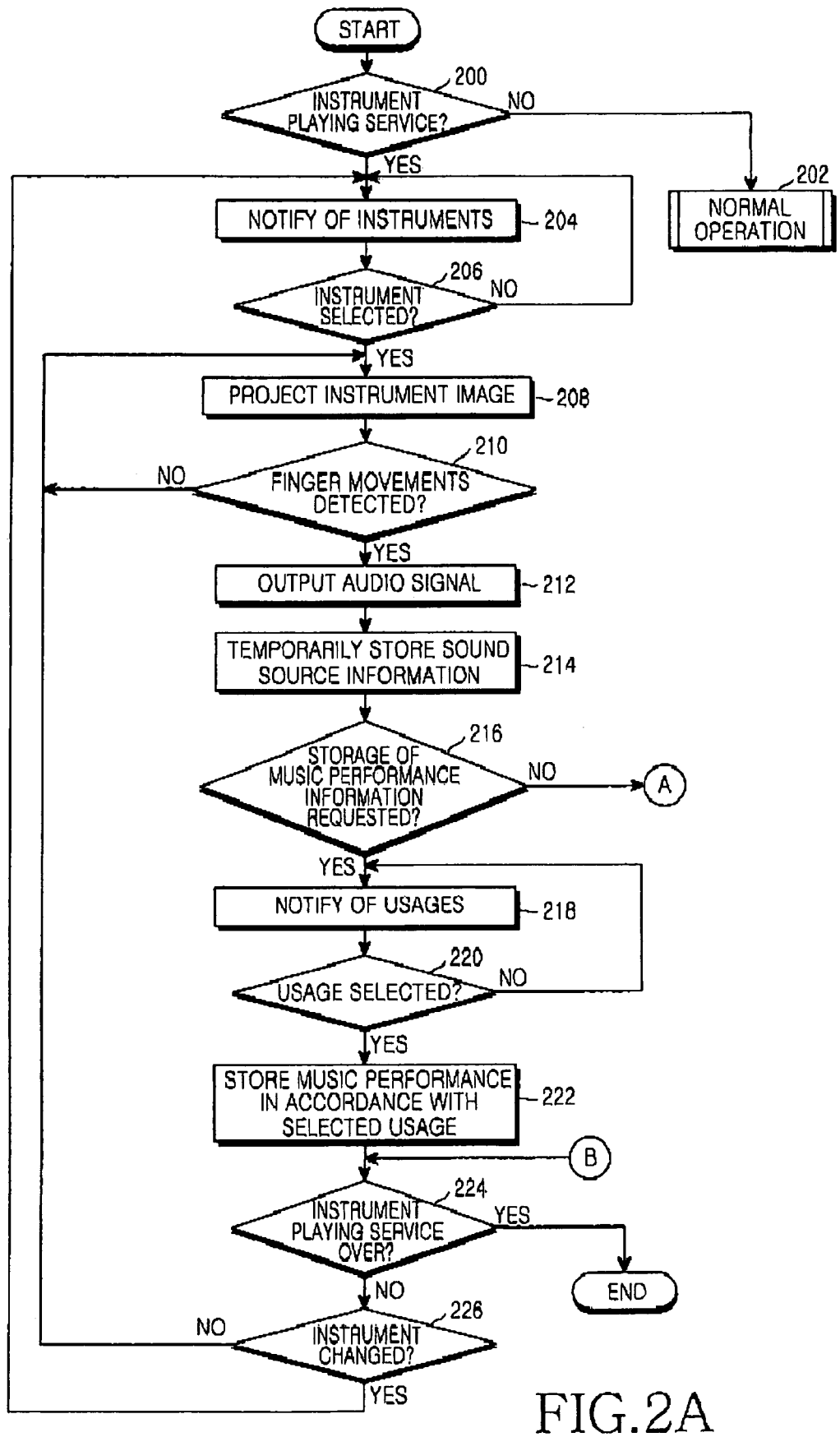
FIGS. 2A and 2B are flowcharts illustrating a method of providing an instrument playing service according to a preferred embodiment of the present invention.
Figure 2B:
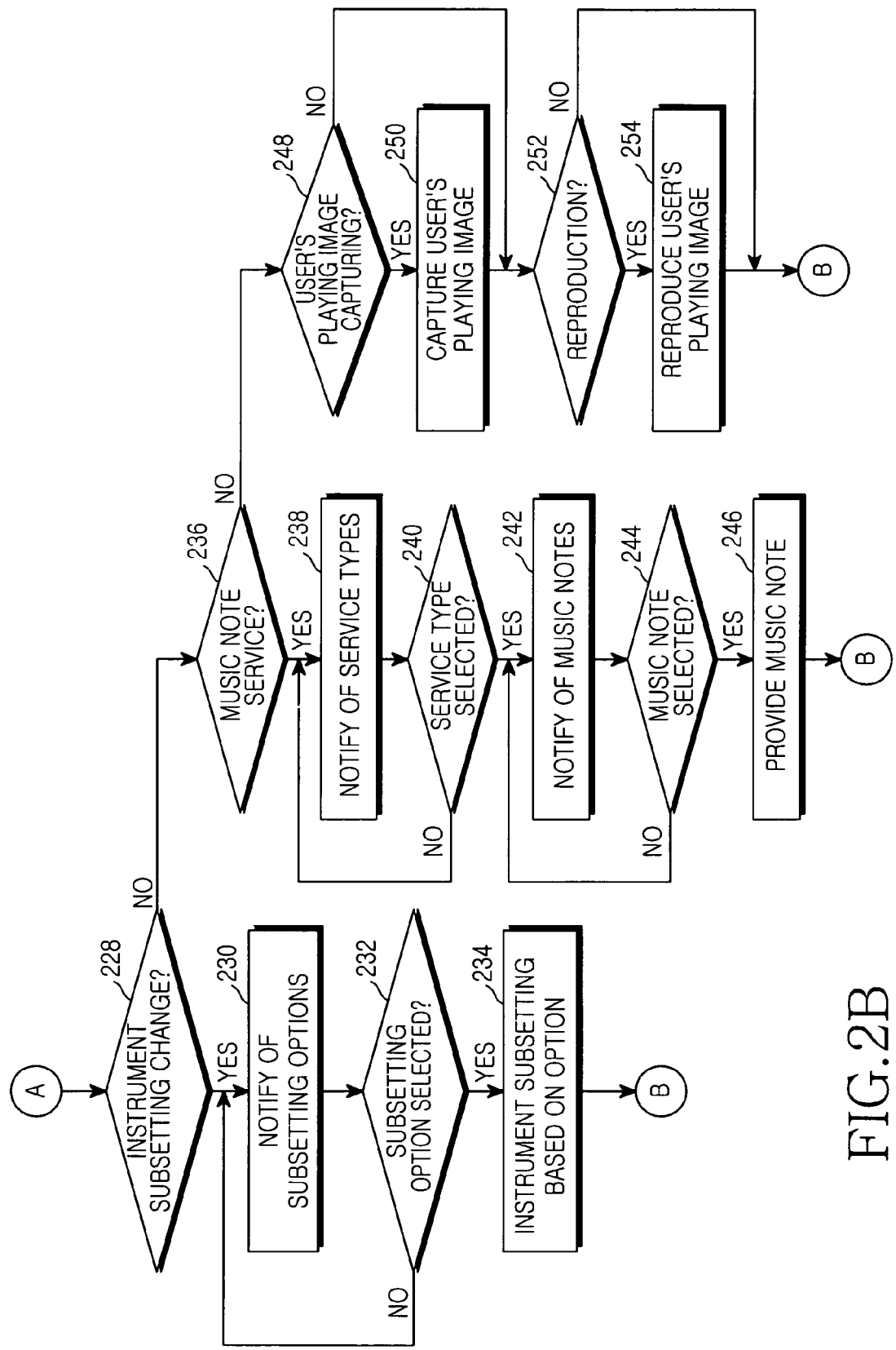
Figure 5:
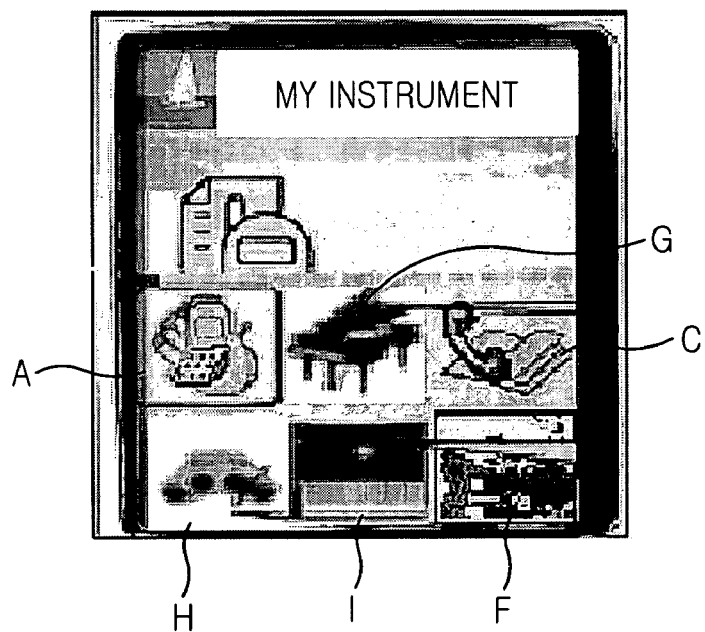

Referring to FIGS. 2A and 2B, upon receipt of a command for entry into the instrument playing service, from the user, through the keypad 122 in step 200, the controller 100 notifies the user of available instruments and prompts the user to select one of them through the display 120 in step 204. If the instrument service is not selected, then the normal operation of the portable terminal is performed in step 202. As illustrated in FIG. 5, the available instruments can be displayed as graphic icons G, H, and I on the display 120.

In step 206, the controller 100 determines if the user has selected one of the displayed instruments. More specifically, upon receiving a user selection of an instrument, the controller 100 reads the image of the selected instrument from the memory 124, projects the instrument image through the first video processing and output portion 110 and the projection display 108 in step 208.

The controller 100 then detects user finger movements on the projected image through the first photographing device 104 and the motion detector 106 in step 210. The controller 100 reads sound source information corresponding to the user finger movements from the memory 124 and provides the sound source information to the sound source chip 116. The sound source chip 116 outputs an audio signal corresponding to the sound source information through the speaker 112 in step 212, thereby playing the instrument.

Each time the audio signal is output as the user plays the instrument in step 212, the controller 100 temporarily stores the sound source information sequentially as music performance information in step 214.

During the instrument playing service, the portable terminal provides a subsetting menu by which to receive user commands for subsetting according to the present invention. The subsetting menu will be described with reference to FIG. 7. The subsetting items of the subsetting menu can be changed considering user convenience.

Figure 7:
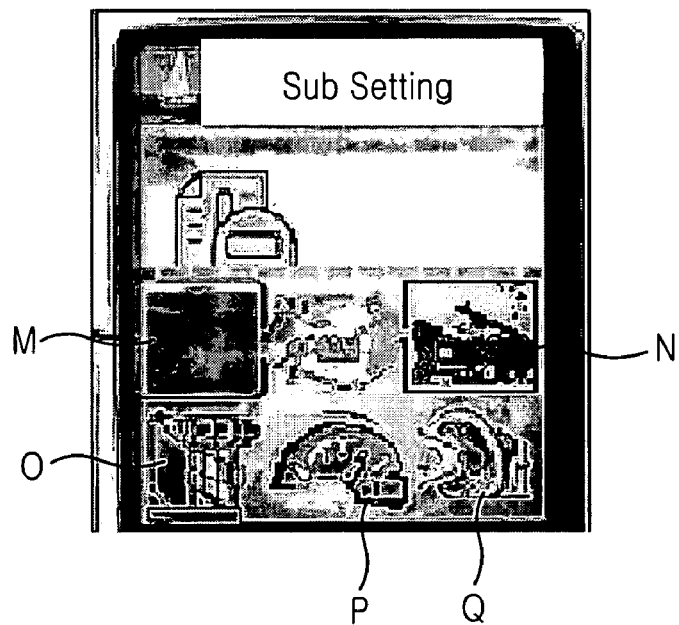

Referring to FIG. 7, the subsetting menu include a graphic icon M for commanding storage of the temporarily stored music performance information as bell sounds, a graphic icon N for commanding on/off of bass reinforcement, a graphic icon O for commanding multi-selection, a graphic icon P for commending capturing the image of the user's playing, and a graphic icon Q for commanding storage of the temporarily stored music performance information as a background. The user can input various commands using the subsetting menu during playing the instrument whose image is projected.

As described above, the user can request storage of the sound source information as the music performance information through the keypad 122 while he is playing the instrument.

Returning to FIGS. 2A and 2B, in step 216, the controller 100 determines if the user has requested storage of the music performance information through the keypad 122 during the music playing. If the user has requested storage, the controller 100 notifies the user of available usages and prompts the user to select one of them in step 218. For example, the usages may include bell sounds and background music.

The controller 100 determines if the user has selected one of the usages in step 220. Upon user selection of a usage for the music performance information, the controller 100 stores the music performance information in correspondence with the selected usage in step 222. Thereafter, if the user has requested terminating of an instrument playing service in step 224, the controller 10 terminates the instrument playing service. If the user has requested changing of an instrument in step 226, the process returns to step 204. Accordingly, the controller 100 notifies the user of available instruments for the user's selection.

In addition, if the user has not requested to terminate playing the instrument or changing instruments in steps 224 to 226, the controller proceeds to step 208 and continuously provides the instrument playing service.

While the music information is stored as bell sounds or background music in the above description, it is obvious that it can be used for other usages.

The user can also request the subsetting of the instrument to be changed through the keypad 122 while playing the instrument.

Figure 6:
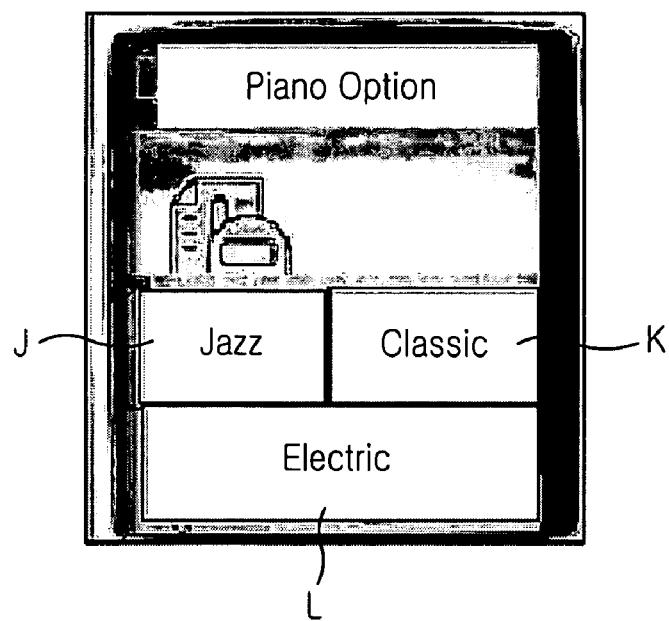

The controller 100 determines if the user has requested changing of the subsetting through the keypad 122 during the music playing in step 228. If the has requested a subsetting change, the controller 100 notifies the user of available subsetting options for the instrument and visually prompts the user to select one of them through the display 120 in step 230. FIG. 6 illustrates exemplary subsetting options for the piano. The piano options are jazz j, classic k, and electric L. The user can change the notes of the piano by selecting one of the subsetting options.

When the user selects a subsetting option for the instrument in step 232, the controller 100 changes the subsetting of the instrument according to the subsetting option and stores information about the changed subsetting in the memory 124 in step 234.

During playing the instrument, the user may request a music note service through the keypad 122. The music note service is a function of outputting a music note to be referred to for playing the instrument through the display 120. The music note can be displayed line by line, page by page, or in any other way.

Hence, the controller 100 determines if the user has requested the music note service through the keypad 122 during the instrument playing in step 236. If the user has requested the music note service, the controller 100 notifies the user of available music note service types and prompts the user to select one of them visually through the display 120 in step 238.

If the user selects one of the music note service types through the keypad 122 in step 240, the controller 100 notifies the user of available music notes stored in the memory 124 and prompts the user to select one of them visually through the display 120 in step 242.

If the user selects one of the music notes in step 244, the controller 100 displays the selected music note according to the selected music note service type on the display 120 in step 246.

As the music note is output through the display 120, the user can conveniently play the instrument referring to the music note. Also, the user may request the image of his music playing to be photographed through the keypad 122.

The controller 100 determines if the user has requested photographing of the image of his playing during the instrument playing in step 248. If the user has requested photographing, the controller 100 controls the second photographing device 126 to capture the image of the user's music playing for a predetermined time and stores the image as music performance image information in the memory 124 in step 250.

Accordingly, the music performance image information can be produced upon user request through the keypad 122.

Thereafter, the controller 100 determines if the user has requested reproduction of the music performance image information through the keypad 122 during his music playing in step 252. If the user has requested reproduction, the controller 100 reproduces the stored music performance image information and outputs it through the display 120 in step 254.

While the music performance image information is reproduced during the music playing in the above example, it is obvious that it can be reproduced when the user does not play the instrument upon a user request, as the technology of reproducing captured images is well known.

In accordance with the present invention as described above, a portable terminal equipped with a projection display projects the image of an instrument, detects user finger movements on the instrument image, and outputs an audio signal corresponding to the user finger movements, thereby enabling the user to play the instrument.

Because the images of various instruments are projected in the shapes of real instruments, the user can play the instruments naturally and conveniently. Also, a user can play an instrument requiring finger movements in a wide range and having lots of keys or a percussion instrument such as the drum.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. An apparatus for providing an instrument playing service, comprising:
   an instrument playing user interface for projecting an image of an instrument, photographing a user's finger movements on the projected instrument image, detecting positions of the user's fingers from the photographed finger movements, and outputting finger movement information according to the detected positions;
   a memory for storing information about the instrument image and sound source information corresponding to the finger movement information on the instrument image;
   a user interface for interfacing with the user;
   a controller for reading the instrument image information, providing the instrument image information to the instrument playing user interface, receiving finger movement information from the instrument playing user interface, reading the sound source information corresponding to the finger movement information from the memory, and providing the read sound source information to a sound source chip;
   the sound source chip for receiving the provided sound source information and outputting an audio signal according to the provided sound source information; and
   a speaker for outputting the audio signal received from the sound source chip.

2. The apparatus of claim 1, wherein the memory sequentially stores the sound source information as music performance information.

3. The apparatus of claim 2, wherein the memory stores music performance information as one of bell sounds and background music, and
   wherein the music performance information is sequentially stored sound source information corresponding to the output audio signal.

4. The apparatus of claim 1, wherein the sound source chip modulates the sound of the output audio signal and the controller controls the sound source chip to modulate the sound of the output audio signal.

5. The apparatus of claim 1, further comprising a photographing device for capturing an image of the user finger movements on the instrument image, wherein the captured image is stored as music performance image information.

6. The apparatus of claim 5, further comprising a display for displaying the music performance image information.

7. The apparatus of claim 1, further comprising a display for displaying a music note.

8. The apparatus of claim 1, wherein the instrument playing user interface comprises:
   a projection display for projecting the image of the instrument;
   a video processing and output portion for receiving the instrument image information from the controller, converting the instrument image information in a form suitable for the projection display, and providing the converted instrument image information to the projection display;
   a photographing device for photographing the user finger movements on the projected instrument image; and
   a motion detector for detecting the user finger movements on the projected instrument image and providing the information about the user finger movements to the controller.

* * * * *